United States Patent [19]

Nakamura et al.

[11] Patent Number: 5,037,899
[45] Date of Patent: Aug. 6, 1991

[54] LACTONE-PRIMARY AMINE MODIFIED EPOXY RESIN AND PROCESS FOR PREPARING THE SAME

[75] Inventors: Hideo Nakamura; Masaru Wakizaka; Michio Hashimoto; Yohzoh Yamamoto, all of Chiba, Japan

[73] Assignee: Mitsui Petrochemical Industries, Ltd., Tokyo, Japan

[21] Appl. No.: 605,150

[22] Filed: Oct. 31, 1990

Related U.S. Application Data

[63] Continuation of Ser. No. 319,666, Mar. 7, 1989, abandoned.

[30] Foreign Application Priority Data

Mar. 7, 1988 [JP] Japan .................................. 63-53069

[51] Int. Cl.$^5$ ............................................. C08L 67/04
[52] U.S. Cl. ..................................... 525/415; 525/533
[58] Field of Search .................................. 525/415, 533

[56] References Cited

U.S. PATENT DOCUMENTS

| | | | |
|---|---|---|---|
| 3,203,920 | 8/1965 | Nikles et al. | 525/533 |
| 3,222,312 | 12/1965 | Wyart et al. | 525/533 |
| 3,382,210 | 5/1968 | Wyart et al. | 525/533 |
| 4,086,294 | 4/1978 | Koleske et al. | 525/415 |
| 4,521,570 | 6/1985 | Watanabe et al. | 525/415 |
| 4,522,984 | 6/1985 | Watanabe et al. | 525/415 |
| 4,559,247 | 12/1985 | Kopf et al. | 525/533 |
| 4,581,424 | 4/1986 | Kordomenos et al. | 525/532 |
| 4,714,743 | 12/1987 | Kordomenos et al. | 525/418 |
| 4,804,718 | 2/1989 | Dervan et al. | 525/533 |

FOREIGN PATENT DOCUMENTS 0211600 2/1987 European Pat. Off. .
2101605 1/1983 United Kingdom .

OTHER PUBLICATIONS

Patent Abstracts of Japan, vol. 11, No. 75 (C-408) (2522), 3/6/87; & JP-A-61231019 (Mitsui Petrochem. Ind. Ltd.) 10/15/86.
Patent Abstracts of Japan, vol. 12, No. 455 (C-548) (3302) 11/29/88; & JP-A-63179918 (Mitsui Petrochem. Ind. Ltd.) 7/23/88.

*Primary Examiner*—Earl Nielsen
*Assistant Examiner*—Frederick Krass
*Attorney, Agent, or Firm*—Birch, Stewart, Kolasch & Birch

[57] ABSTRACT

A modified epoxy resin provided with improved flexibility and curing properties is prepared by subjecting a bisphenol type epoxy resin (a) to steps (i) and (ii):

(i) the step wherein the epoxy group is reacted with a primary amine (b), and
(ii) the step wherein secondary hydroxyl group is at least partly esterified by a reaction with a lactone.

10 Claims, No Drawings

LACTONE-PRIMARY AMINE MODIFIED EPOXY RESIN AND PROCESS FOR PREPARING THE SAME

This application is a continuation of application Ser. No. 07/319,666 filed on Mar. 7, 1989, now abandoned.

BACKGROUND OF THE INVENTION

Field of the Invention

This invention is directed to a modified epoxy resin, and more specifically, to a novel modified epoxy resin having improved flexibility and curing properties which can be effectively utilized in a powder coating, and a process for making such a modified epoxy resin.

Powder coatings are finding a wider use because of their good hygienic qualities and economical advantages. Powder coatings of epoxy resin type, however, had only limited applications since they had poor flexibility.

Generally, it is relatively easy to impart flexibility to solvent type coatings since various flexibilizers and softeners, which are usually liquid, can be employed in this type of coatings. These liquid flexibilizers and softeners as such can not be employed in powder coatings.

Solid type flexibilizers are also known. These solid type flexibilizers, however, are incompatible with high molecular weight epoxy resin while they are compatible with liquid type epoxy resin. There is thus a need for a flexible epoxy resin.

On the other hand, a reduction in baking time of the powder coatings is desired for improving the productivity, although baking at high temperature is undesirable for an economical reason. An addition of an increased amount of curing agent is also undesirable since the resulting increased amount of free components in the coating after its curing may adversely affect the chemical resistance of the coating.

After an investigation to overcome the above-described defects, the inventors of the present invention have found that, by subjecting the epoxy resin to a reaction with a primary amine, the chain may be extended to thereby improve the curing properties, and by reacting the epoxy resin with a lactone, some of secondary hydroxyl groups may undergo a ring opening polymerization by which an appropriate flexibility is imparted to the hard, fragile epoxy resin.

It is therefore an object of this invention to provide a novel modified epoxy resin which has both appropriate flexibility and curing properties.

It is a further object of this invention to provide a process for preparing the novel modified epoxy resin.

Other objects and advantage of the invention will become apparent as the description thereof proceeds.

SUMMARY OF THE INVENTION

According to the present invention, there is provided a process for preparing a novel modified epoxy resin wherein a bisphenol type epoxy resin (a) is subjected to steps (i) and (ii):

(i) the step wherein the epoxy group is reacted with a primary amine (b), and (ii) the step wherein the secondary hydroxyl group is at least partly esterified by a reaction with a lactone.

According to the present invention, there is also provided a novel epoxy resin prepared by the above process.

DETAILED DESCRIPTION OF THE INVENTION

The modified epoxy resin of the present invention is derived from a bisphenol type epoxy resin which is prepared by a reaction between a bisphenol and a haloepoxide such as epichlorohydrin and $\beta$-methylepichlorohydrin. The bisphenol type epoxy resin may have a general formula:

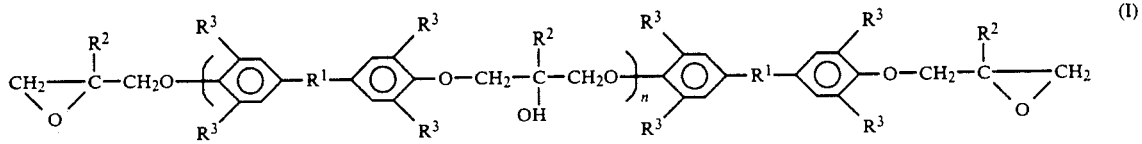

wherein $R^1$ is selected from the group consisting of —$CH_2$,

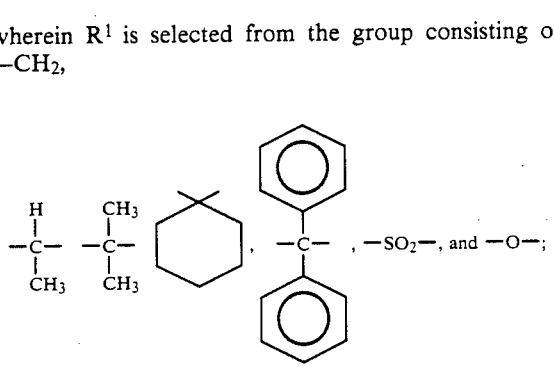

$R^2$ is hydrogen atom or methyl group;
$R^3$ is hydrogen atom or a halogen atom; and
n is number of the repeating structural unit including zero.

Typical examples of the bisphenol type epoxy resins are glycidyl ethers and $\beta$-methylglycidyl ethers which are prepared from bisphenols as exemplified below.

Examples of the bisphenols used herein include 2,2-bis(4-hydroxyphenyl)propane (commonly referred to as bisphenol-A), bis(4-hydroxyphenyl)methane (commonly referred to as bisphenol-F), and 1,1-bis(4-hydroxyphenyl)ethane (commonly referred to as bisphenol-AD).

Preferred among these bisphenol type epoxy resins are glycidyl ethers of 2,2-bis(4-hydroxyphenyl)propane.

The bisphenol type epoxy resin as component (a) preferably has an epoxy equivalent of about 150 to about 2500, and more preferably, about 160 to about 1800.

Epoxy group of the bisphenol type epoxy resin (a) is reacted with a primary amine (b) in step (i) of the present invention. Examples of the primary amines which may be used in the step (i) include (1) aliphatic primary amines such as propylamine, butylamine, hexylamine, octylamine, laurylamine, stearylamine, palmitylamine, and oleylamine, among which those having at least 6 carbon atoms are preferred, and those having 8 to 20 carbon atoms are most preferred;

(2) aromatic primary amines such as aniline, toluidine, xylidine, cumidine, hexylaniline, nonylaniline, and dodecylaniline, among which those having a $C_{3-20}$ alkyl group attached to the benzene ring of aniline are preferred;

(3) cycloaliphatic primary amines such as cyclopentylamine, cyclohexylamine, and norbornylamine, among which those having 6 to 20 carbon atoms are preferred; and (4) aromatic nuclearyl substituted aliphatic primary amines such as benzylamine, phenetylamine, 4-phenyl-3-methylbutylamine, and cinnamylamine, among which those having 7 to 15 carbon atoms are preferred.

Preferred among these are aliphatic primary amines having 8 to 20 carbon atoms.

The amount of primary amine (b) used may generally range from about 0.05 to about 50 parts by weight, and preferably from about 0.1 to about 20 parts by weight per 100 parts by weight of bisphenol type epoxy resin (a) in view of the reactivity of the resulting modified epoxy resin and the toughness of the coating obtained therefrom. Needless to say, said amount of the primary amine (b) used is determined in consideration of the epoxy equivalent of the modified epoxy resin to be prepared.

At least some of the secondary hydroxyl groups in the bisphenol type epoxy resin (a) are reacted with a lactone in step (ii) of the present invention. The lactones which may be used in step (ii) include those containing 3 to 10 carbon atoms, and preferably those containing 3 to 8 carbon atoms, such as $\beta$-propiolactone, $\delta$-valerolactone, $\epsilon$-caprolactone, $\gamma$-butyrolactone, $\beta$-butyrolactone, $\gamma$-valerolactone, among which $\gamma$-butyrolactone and $\epsilon$-caprolactone being particularly preferred.

The amount of lactone used is determined such that from about 0.1 to about 50% by weight, and preferably from about 1 to about 20% by weight of lactone polymer (polyester) is contained in the resulting modified epoxy resin.

Reaction of the epoxy group in bisphenol type epoxy resin (a) and primary amine (b) is carried out with or without a catalyst at a temperature of about 50 to about 250° C., preferably about 100° to about 200° C. for about 2 to 5 hours.

If desired, a bisphenol (c) may be co-present at the reaction between components (a) and (b), wherein the bisphenol (c) is then reacted with the epoxy group of the bisphenol type epoxy resin. The bisphenol (c) which can be used has the general formula:

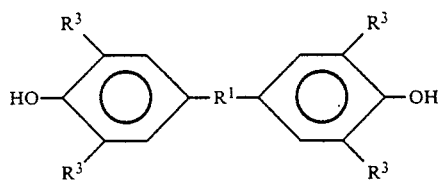

wherein $R^1$ and $R^3$ are as defined above. The bisphenol (C) may preferably, but not necessarily, be the same as the one used for constructing the backbone of the bisphenol type epoxy resin.

When the step (i) is carried out in co-presence of bisphenol (c), the starting epoxy resin (a) employed may generally have an epoxy equivalents of from about 150 to about 500, and preferably, from about 160 to about 400.

The amounts of epoxy resin (a), primary amine (b), and bisphenol (c) employed may preferably be determined to meet the equation:

$$600 \leq \frac{A + B + C}{A/X - 2B/Mb - 2C/Mc} \leq 2500$$

wherein the amounts of A, B, and C are in grams of epoxy resin (a), primary amine (b), and bisphenol (c) employed, respectively, X is epoxy equivalent of epoxy resin, and Mb and Mc are the molecular weights of the primary amine and the bisphenol, respectively.

The catalysts used in the reaction of step (i) include alkali metal hydroxides such as sodium hydroxide, potassium hydroxide, and lithium hydroxide; alkali metal alcolates such as sodium methylate; tertiary amines such as dimethylbenzylamine, triethyamine, and pyridine; quaternary ammonium salts such as tetramethylammonium chloride and benzyltrimethylammonium chloride; organic phosphorus compounds such as triphenylphosphine and triethylphosphine; quaternary phosphonium salts such as triphenylphosphine methyl iodide adduct; alkali metal salts such as sodium carbonate and lithium chloride; Lewis acids such as boron trifluoride, aluminum trichloride, and tin tetrachloride; and complexes such as boron trifluoride-diethyl ether adduct.

Although different amounts of the catalyst may be employed in accordance with the reaction temperature, the catalyst is generally present in an amount of from about 0.01 to about 10,000 parts, preferably from about 0.1 to about 1,000 parts by weight per million parts by weight (ppm) of the reaction material.

Solvent may be used in the reaction if desired. There may be used those solvents which are free of active hydrogen, for example, hydrocarbons such as toluene and xylene; and ketones such as methyl isobutyl ketone, methyl ethyl ketone, and cyclohexanone.

The esterification of the secondary hydroxyl group in bisphenol type epoxy resin (a) is carried out with or without a catalyst at a temperature of from about 80° to about 250° C., preferably from about 100° to about 200° C. for about 3 to 10 hours.

The catalysts which may be used in the reaction of step (ii) include organic and inorganic titanium compounds such as tetrabutyltitanate, tetraethyltitanate, butoxytitanium trichloride, and titanium tetrachloride; organic and inorganic aluminum compounds such as triethylaluminum, ethylaluminum chloride, and aluminum trichloride; organic and inorganic zinc compounds such as diethylzinc, and zinc chloride; organic and inorganic tin compounds, such as dibutyltin laurate, and stannous chloride; acids such as p-toluenesulfonic acid, and nitric acid; alkaline metals such as lithium, and sodium; alkaline metal hydroxides such as lithium hydroxide, and sodium hydroxide; alkaline metal salts such as sodium carbonate, lithium acetate, and lithium chloride; and tertiary amines such as triethylamine, and pyridine.

In general, the catalyst is present in an amount of from about 0.01 to about 1,000 parts, preferably from about 0.1 to about 500 parts by weight per million parts by weight (ppm) of the resin.

Solvent may be used in the reaction if desired, such as toluene, xylene, methyl isobutyl ketone, methyl ethyl ketone, and cyclohexanone.

Steps (i) and (ii) as described above may be carried out in any desired order although it is more preferable to carry out step (i) before step (ii).

The thus obtained modified epoxy resin usually has an epoxy equivalent of about 600 to about 2,500, and a number average molecular weight of about 1,000 to about 7,000.

Improved powder coatings may be prepared by combining the modified epoxy resin of the present invention with curing agents including hydrazides such as dicyandihydrazide, adipic acid dihydrazide, and sebacic acid dihydrazide; solid anhydrides such as hexahydrophthalic acid anhydride, and trimellitic acid anhydride; and aromatic amines such as diaminodiphenylmethane and diaminodiphenylsulfone. Coating films obtained from such a powder coating have excellent flexibility. Moreover, since the powder coatings prepared from the modified epoxy resin of the present invention have improved curing properties, the baking of the powder coatings can be carried out in an energy-conserved economical line.

EXAMPLES

Examples of the present invention are given below by way of illustration and not by way of limitation.

In the Examples, the epoxy equivalents are determined as described below.

Evaluation of Epoxy Equivalents

1. A 200-ml Erlenmeyer flask is charged with 0.2 to 10 g of resin sample, and 25 ml of dioxane is added thereto to dissolve the resin.

2. To this solution, exactly 25 ml of 0.2N hydrochloric acid in dioxane is added, sealed, thoroughly mixed, and allowed to stand for 30 minutes.

3. To this solution, 50 ml of mixed solution of toluene/ethanol (1/1, volume ratio) is added, and the resulting solution is titrated with 0.1N sodium hydroxide methanol solution by using cresol red as indicator.

4. The epoxy equivalents are calculated on the basis of the following equation:

$$A = \frac{W \times 1000}{(Q - S) \times 0.1 \times f}$$

wherein W is the weight of the resin sample in gram,
S is the volume of 0.1N sodium hydroxide added in ml,
f is the factor of 0.1N sodium hydroxide,
Q is the volume of 0.1N solution of sodium hydroxide added in ml in the blank test.

EXAMPLE 1

Synthesis of Resin

A 1-liter separable flask equipped with a stirrer, a thermometer, a nitrogen inlet, and a condenser was charged with 250 g of a bisphenol-A epoxy resin having an epoxy equivalent of 188 g/equivalent, 100.3 g of bisphenol-A, and 50 ml of xylene. The contents were heated to a temperature of 70° C. under nitrogen atmosphere, and 1 ml of 0.65N aqueous sodium hydroxide was added thereto.

The contents were heated to a temperature of 150° C. while stripping off water and xylene under vacuum. By agitating the contents at a pressure of 5 mmHg and at a temperature of 150° C. for 1 hour, xylene was completely removed.

After restoring the pressure, 10.4 g of stearylamine (Farmin 80, manufactured by KAO K.K.) was added, and the reaction was carried out at 185° C for 5 hours.

To the contents, 19 g of ε-caprolactone was added, and the reaction was carried out for another 6 hours, yielding a modified epoxy resin having an epoxy equivalent of 1150 g/equivalent and a softening point of 105° C.

Preparation of Powder Coating

A mixture of 60 parts by weight of the modified epoxy resin prepared above and 24 parts by weight of dicyandiamide is milled in a kneader at 120° C. for 7 minutes to prepare a curing agent mixture. 14 parts by weight of this curing agent mixture and 53 parts by weight of titanium oxide is added to 90 parts by weight of the modified epoxy resin prepared above, and milled in a kneader at 120° C. for 8 minutes. The milled mixture is finely ground into a powder coating having an average particle size of 100 to 150 mesh.

Evaluation of Gel Time and Impact Strength

The thus prepared powder coatings are evaluated for their gel time and impact strength.

(1) Gel time

On a recess having diameter of 20 mm and depth of 2 mm in a heated plate of a gel time tester (manufactured by Nisshin Science K.K.) controlled at 180° C, 0.5 g of the powder coating prepared above is placed, and stirred with a glass rod having a diameter of 6 mm. Gel time, which is the time required for the once dissolved powder coating to cure and become non-liquid, is measured.

(2) Impact strength

A 1-cm thick mild steel sheet having one major surface polished with #120 sand paper is preheated to 250° C. To this surface, the powder coating prepared above is applied by electrostatic deposition to a thickness of about 300 μm. The steel sheet is kept at 230° C for 10 minutes to produce a coated steel sheet. Impact strength of this coated steel sheet is measured at room temperature by using DuPont impact tester under the conditions of ⅜ inch and 2 kg.

The results are shown in Table 1.

EXAMPLE 2

The procedure of Example 1 is repeated except that 7.1 g of laurylamine (Farmin 20D, manufactured by KAO K.K.) is employed instead of 10.4 g of stearylamine, and 18.8 g of ε-caprolactone is employed instead of 19.0 g.

A powder coating is prepared and evaluated by the same procedures as in Example 1.

The results are shown in Table 1.

EXAMPLE 3

The procedure of Example 1 is repeated except that 3.7 g of cyclohexylamine is employed instead of 10.4 g of stearylamine, and 18.7 g of ε-caprolactone is employed instead of 19.0 g.

A powder coating is prepared and evaluated by the same procedures as in Example 1.

The results are shown in Table 1.

COMPARATIVE EXAMPLE 1

The procedure of Example 1 is repeated except that a powder coating is prepared from a bisphenol-A solid epoxy resin having epoxy equivalents of 919 g/eq. and softening point of 98° C instead of the modified epoxy resin of the present invention.

The evaluation is carried out in the same procedure as in Example 1.

The results are shown in Table 1.

COMPARATIVE EXAMPLE 2

The procedure of Comparative Example 1 is repeated except that 1 part by weight of 2-undecylimidazole is added as a curing agent in the preparation of the powder coating.

The results are shown in Table 1.

TABLE 1

|  | Example | | | Comparative Example | |
|---|---|---|---|---|---|
|  | 1 | 2 | 3 | 1 | 2 |
| Epoxy equivalent of modified epoxy resin, g/equivalent | 1150 | 1080 | 1130 | — | — |
| Softening point, °C. | 102 | 103 | 108 | — | — |
| Gel time, sec. | 45 | 42 | 40 | 120 | 40 |
| Impact strength, kg-m | 1.0 | 0.95 | 0.8 | 0.25 | 0.3 |

As apparent from the results shown in Table 1, the modified epoxy resin prepared in accordance with the present invention is provided with improved flexibility as well as excellent curing properties. Therefore, the present modified epoxy resin can be prepared into powder coatings which are used for coating items such as pipes and reinforcing steel rods which are required to resist shock loading.

We claim:

1. A process for preparing a modified epoxy resin comprising the steps of:
   (i) reacting a bisphenol epoxy resin (a) with a primary amine (b) at a temperature of 50° to 250° C. and in the presence or absence of a bisphenol (c) to form a chain extended product of the bisphenol epoxy resin such that said product has unreacted epoxy groups, wherein the amount of the primary amine (b) reacted ranges from about 0.05 to 50 parts by weight per 100 parts by weight of the bisphenol epoxy resin (a), and
   (ii) esterifying at least a part of the secondary hydroxy groups of said chain extended product at a temperature of 80° to 250° C. with 0.01 to 50% by weight of a lactone, wherein said bisphenol epoxy resin (a), said primary amine (b) and said bisphenol (c) are each reacted in respective amounts which satisfy the equation:

$$600 \leq \frac{A + B + C}{A/X + 2B/Mb - 2C/Mc} \leq 2500$$

in which
   A represents the amount of the bisphenol epoxy resin (a) in grams;
   B represents the amount of the primary amine (b) in grams;
   C represents the amount of the bisphenol (c) epoxy resin (a);
   Mb represents the molecular weight of the primary amine (b); and
   Mc represents the molecular weight of the bisphenol (c).

2. The process according to claim 1 wherein the bisphenol epoxy resin (a) has an epoxy equivalent of about 150 to 2500.

3. The process according to claim 1 wherein the primary amine (b) is selected from the group consisting of propyl amine, butyl amine, hexyl amine, octyl amine, lauryl amine, stearyl amine, palmityl amine and oleyl amine.

4. The process according to claim 1 wherein the primary amine is an aliphatic primary amine, an aromatic primary amine, a cycloaliphatic primary amine or an aromatic nuclearyl substituted aliphatic primary amine.

5. The process according to claim 1 wherein the lactone contains from 3 to 8 carbon atoms.

6. The process according to claim 1 wherein step (i) is carried out in the presence or absence of a catalyst at a temperature of about 50° to 250° C. for about 2 to 5 hours and step (ii) is carried out in the presence or absence of a catalyst at a temperature of about 80° to 250° C. for about 2 to 5 hours.

7. A modified epoxy resin prepared by the process according to claim 1.

8. A modified epoxy resin prepared by the process according to claim 4.

9. A modified epoxy resin prepared by the process according to claim 5.

10. A modified epoxy resin prepared by the process according to claim 6.

UNITED STATES PATENT AND TRADEMARK OFFICE
CERTIFICATE OF CORRECTION

PATENT NO. : 5,037,899
DATED : August 6, 1991
INVENTOR(S) : Hideo NAKAMURA et al.

It is certified that error appears in the above-identified patent and that said Letters Patent is hereby corrected as shown below:

In column 7, line 48, change "0.01" to --0.1--.

In column 8, line 5 change

"$600 \leq \dfrac{A + B + C}{A/X + 2B/Mb - 2C/Mc} \leq 2500$" should be

--$600 \leq \dfrac{A + B + C}{A/X - 2B/Mb - 2C/Mc} \leq 2500$--.

In column 8, line 15, delete "epoxy resin (a)"

In column 8, line 16, before "Mb" insert --X represents the epoxy equivalent of the bisphenol epoxy resin (a);--

Signed and Sealed this

Twenty-fifth Day of April, 1995

Attest:

BRUCE LEHMAN

*Attesting Officer*     *Commissioner of Patents and Trademarks*